(12) United States Patent
Fontbonne et al.

(10) Patent No.: US 10,031,239 B2
(45) Date of Patent: Jul. 24, 2018

(54) METHOD FOR MEASURING DOSAGE BY MEANS OF A RADIATION DETECTOR, ESPECIALLY AN X-RADIATION OR GAMMA-RADIATION DETECTOR, USED IN THE SPECTROSCOPIC MODE, AND DOSAGE MEASUREMENT SYSTEM USING SAID METHOD

(71) Applicant: Orano Cycle, Courbevoie (FR)

(72) Inventors: Jean-Marc Fontbonne, Caen (FR); Jean Colin, Douvres-la-Delivrande (FR); Cathy Fontbonne, Caen (FR); Jacky Jehanno, Gaujac (FR)

(73) Assignee: Orano Cycle, Courbevoie (FR)

( * ) Notice: Subject to any disclaimer, the term of this patent is extended or adjusted under 35 U.S.C. 154(b) by 0 days.

(21) Appl. No.: 14/767,882

(22) PCT Filed: Feb. 19, 2014

(86) PCT No.: PCT/EP2014/053253
§ 371 (c)(1),
(2) Date: Aug. 13, 2015

(87) PCT Pub. No.: WO2014/128174
PCT Pub. Date: Aug. 28, 2014

(65) Prior Publication Data
US 2016/0003950 A1 Jan. 7, 2016

(30) Foreign Application Priority Data
Feb. 22, 2013 (FR) ...................... 13 51585

(51) Int. Cl.
*G01T 1/00* (2006.01)
*G01T 1/02* (2006.01)
(52) U.S. Cl.
CPC ..................... *G01T 1/02* (2013.01)

(58) Field of Classification Search
CPC ........................................................ G01T 1/02
(Continued)

(56) References Cited

U.S. PATENT DOCUMENTS 5,004,921 A 4/1991 Moscovitch
5,572,028 A 11/1996 Moscovitch et al.
(Continued)

FOREIGN PATENT DOCUMENTS

JP 2001-500612 A 1/2001
JP 2009-526213 A 7/2009
RU 2092872 C1 10/1997

OTHER PUBLICATIONS

Clouvas, A., et al.; Monte Carlo based method for conversion of in-situ gamma ray spectra obtained with a portable Ge detector to an incident photon flux energy distribution; Health Physics; vol. 74, No. 2; Feb. 1998; pp. 216-230.
(Continued)

*Primary Examiner* — David Porta
*Assistant Examiner* — Abra Fein
(74) *Attorney, Agent, or Firm* — Pearne & Gordon LLP

(57) ABSTRACT

A method for measuring dosage by means of a radiation detector, especially an X-radiation or gamma-radiation detector, used in the spectroscopic mode, and a dosage measurement system using said method.
A range of energies and a dose type H is chosen, a radiation detector of a given type is used, spectra measured by the detector are established for various radiations of the given type, the energies of which are within the chosen range and the respective doses of which are known, and from the spectra, a weighting function is established, that is a correspondence between a mean dose increment and a mean energy, deposited into the detector. This enables a person
(Continued)

provided with a dosimeter identical to the detector to know at any time the mean absorbed dose rate, expressed in the amount H.

7 Claims, 2 Drawing Sheets

(58) Field of Classification Search
USPC .......................................................... 250/395
See application file for complete search history.

(56) References Cited

U.S. PATENT DOCUMENTS

| | | |
|---|---|---|
| 6,300,635 B1 | 10/2001 | Brambilla |
| 6,423,972 B1 | 7/2002 | Fehrenbacher et al. |
| 7,983,397 B2 | 7/2011 | Michel |
| 2009/0127468 A1 | 5/2009 | Fehrenbacher |
| 2011/0051901 A1 | 3/2011 | Michel |

OTHER PUBLICATIONS

"Chapter 4" in: Podgorsak: "Radiation Oncology Physics: A Handbook for Teachers and Students"; Jan. 1, 2006; International Atomic Energy Agency, Vienna; pp. 101-121.

"Strahlenschutzverordnung", Internet Citation; Jun. 18, 2002; URL:http://www.rp• giessen.de/me_in/medien/strahlschutz/strlschv_18062002.pdf; pp. 112-115.

International Search Report and Written Opinion for PCT Application No. PCT/EP2014/053253 dated May 28, 2014.

International Preliminary Report on Patentability for PCT Application No. PCT/EP2014/053253 dated Jun. 3, 2015.

Preliminary Search Report for France Application No. 1351585 dated Nov. 27, 2013.

Search Report dated Jun. 13, 2017 of Russian Patent Application No. 2015140137.

Japanese Office Action with translation issued for Japanese Application No. 2015-558437 dated Oct. 3, 2017.

Shigeru Moriuchi, "A New Method of Dose Evaluation by Spectrum DoConversion Operator and Determination of the Operator"[online], Jaeri, Japan, Japan Atomic Energy Research Institute, Jul. 1971, 1209, pp. 1-15, [searched on Sep. 20, 2017], the internet, URL, http://jolissrch-inter.tokai-sc.jaea.go.jp/pdfdata/JAERI-1209.pdf.

Shigeru Moriuchi, "Measurement and Evaluation of Environmentaly-radiationDoseby Spectrum Weighting Function Method", Ionizing Radiation, Japan, JSAP Ionization Radiation Division, Oct. 1991, vol. 17, No. 2, pp. 28-47.

METHOD FOR MEASURING DOSAGE BY MEANS OF A RADIATION DETECTOR, ESPECIALLY AN X-RADIATION OR GAMMA-RADIATION DETECTOR, USED IN THE SPECTROSCOPIC MODE, AND DOSAGE MEASUREMENT SYSTEM USING SAID METHOD

CROSS-REFERENCE TO RELATED PATENT APPLICATION

The present application is a National Stage Application of International Application No. PCT/EP2014/053253 entitled "METHOD FOR MEASURING DOSAGE BY MEANS OF A RADIATION DETECTOR, ESPECIALLY AN X-RADIATION OR GAMMA-RADIATION DETECTOR, USED IN THE SPECTROSCOPIC MODE, AND DOSAGE MEASUREMENT SYSTEM USING SAID METHOD" filed Feb. 19, 2014, which claims priority to French Patent Application Number 13 51585 filed Feb. 22, 2013, the contents of which are incorporated herein by reference in their entirety.

TECHNICAL FIELD

The present invention relates to a method for measuring dose by means of a radiation detector, in particular an X-radiation or gamma-radiation detector.

It also relates to a system for measuring a dose, using this method.

It is applicable in particular to flow cytometry, high energy physics and in the field of nuclear physics instrumentation.

STATE OF PRIOR ART

Numerous dosimetry quantities have been defined by the international authorities: in particular the absorbed dose, the personal dose at 10 mm, or at 70 μm, the dose under unidirectional flux, normal to the staff, or under omnidirectional flux. These quantities are generally based on the expression of the dose absorbed by a given medium (often soft tissues) at a particular point of a phantom the shape and nature of which are defined by the appropriate authorities.

To design a dosimeter enabling either of these quantities to be measured, it is recommended to get as close as possible to the imposed conditions or to multiply the instruments so as to correct their responses.

Various known dosimetry techniques are described hereinafter.

In high energy X dosimetry (radiation therapy), the detectors generally used are air ionization chambers. Air is a medium equivalent to the tissues in a range of energies ranging from 100 keV to a few MeV for photons. In absolute dosimetry, the ionization chambers are dipped in water (phantom equivalent to the tissues). This use of the ionization chambers and these properties provide them with excellent properties for the measurements of the absorbed doses.

For the dosimetry of patients undergoing a radiation therapy, the detection medium is generally silicon, a material which is not equivalent to the tissues. The silicon response is then corrected by means of an equilibration cap which enables the detector to be placed at the desired "virtual" depth and compensates for its response function. Under these conditions, the dosimeter is calibrated for a given depth, a given radiation quality and a defined direction.

For the dosimetry of people which handle radioactive materials, the range of energies is quite different from that which is used in radiation therapy. Passive badges which are generally made of several lands containing films or other sensitive media such as lithium fluoride for example. Each land is covered with a given equilibration cap. The simultaneous exploitation of the individual information, respectively provided by the various detectors, enables the desired quantity to be retrieved.

U.S. Pat. No. 5,572,028 describes a multi-element dosimetry system. U.S. Pat. No. 6,423,972 describes a method and a device for determining neutron spectra using at least two appropriate detectors. Both these documents will be referred to hereafter.

Further, some dosimeters exploit a spectrum which is measured in a detector, typically a solid detector or a scintillating crystals-based detector. The spectrum is acquired for a predefined time and generally analyzed for assessing the incident particle fluence: a spectral deconvolution is performed. In view of the transfer curves established by the international authorities, the absorbed dose can thus be determined, in the desired measurement unit.

This is a response correction method by spectral deconvolution. A dosimetry method which uses such a deconvolution is also known from the following document:

US 2009/0127468, Method for the spectrometric photon dosimetry for X-ray and gamma radiation.

These known methods use an a posteriori signal processing and therefore do not enable the absorbed dose to be measured in real time—at least, on a very wide range of energies of the incident radiations.

DISCLOSURE OF THE INVENTION

One purpose of the present invention is to overcome this drawback. And for this, it uses, unlike these known methods, a weighting function which is established once and for all.

Precisely, one object of the present invention is to provide a method for measuring an absorbed dose, characterized in that:

a range of energies is chosen,
a dose type H is chosen,
a radiation detector of a given type is used,
spectra $(dn/dE)_s$ measured by the detector are established for various incident radiations of the given type S, the respective energies of which are within the chosen range and the respective doses $H_S$ of which are known (by measurement or calculation, and
from the spectra $(dn/dE)_s$, a weighting function F(E) is established, that is a correspondence between a mean dose increment and a mean energy E, deposited into the detector, which enables a person provided with a dosimeter identical to the radiation detector of the given type, that served to establish the weighting function F(E), to know at any time the mean absorbed dose rate, expressed in the amount H.

In the present invention, therefore, a single radiation detector of a given type is used (the invention is based on a spectroscopic method), whereas the methods disclosed by U.S. Pat. No. 5,572,028 and U.S. Pat. No. 6,423,972 require at least two of them. Furthermore, the method disclosed by U.S. Pat. No. 5,572,028 does not enable spectra to be established as is made in the present invention: this known method is not capable of measuring spectra of deposited energy. Further, in this document, it is not discussed to establish, from established spectra, a weighting function of the kind used in the present invention: in this known method, weights are measured from quantities L1, L2 ..., each quantity being proportional to the total energy deposited into one of the detectors used. And U.S. Pat. No. 6,423,972 is only a variation of U.S. Pat. No. 5,572,028 for neutron fluxes.

According to a preferred embodiment of the method, object of the invention, the lowest energy of the range of energies is lower than 50 keV.

Preferably, the chosen dose type H is Hp (0.07).

According to a preferred embodiment of the invention, the detector is an X-radiation and gamma-radiation detector.

Preferably, the detector is chosen from the multi-pixel photon counters, the silicon detectors and the scintillator-photomultiplier assemblies.

The single weighting function, F(E), can be established by solving simultaneously, for all the radiations S, the equation:

$$\sum_E F(E) \cdot \left(\frac{dn}{dE}\right)_S \cdot \Delta E = H_S$$

for each radiation S, where $H_S$ represents the dose associated with the radiation S, $(dn/dE)_S$ represents the count number, recorded at the energy E for the radiation S, and $\Delta E$ represents the energy measurement pitch for the spectrum (it is mentioned herein for reasons of homogeneity of the measurement units).

The present invention also relates to a system for measuring a dose, using the method, object of the invention, this system comprising:
  a dosimeter identical to the radiation detector of the given type, this dosimeter being able to provide signals representative of the radiations it receives, and
  an electronic processing device, wherein the weighting function F(E) is stored and which is provided to process signals provided by the dosimeter and determine, at any time, the mean absorbed dose.

BRIEF DESCRIPTION OF THE DRAWINGS

The present invention will be better understood upon reading the description of exemplary embodiments given hereinafter, purely by way of indicating and in no way limiting purposes, making reference to the appended drawings in which.

DETAILED DISCLOSURE OF PARTICULAR EMBODIMENTS

In the following, various examples of the method object of the invention are given.

Figure 1:
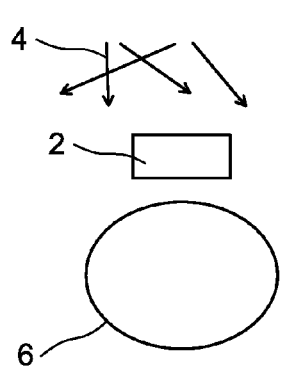
FIG. 1 schematically illustrates the absorption of some radiation dose in a given detector medium, FIG. 2 schematically illustrates the absorption of this dose in another medium for which a dose H is attempted to be measured.
Figure 2:
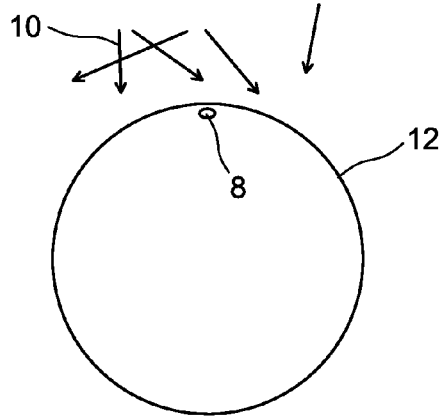

This method enables the dose absorbed in a given detector medium 2 (see FIG. 1 which corresponds to a practical situation and in which the incident radiations have the reference 4, and the operating staff, or an equivalent phantom, has the reference 6) to be transferred to another medium for which the initial quantity H is attempted to be measured, for example Hp(0.07Ω), at a point 8 (see FIG. 2 which corresponds to a theoretical situation, defined by the authorities, and in which the incident radiations have the reference 10 and the reference 12 represents a phantom).

This initial quantity is not necessarily experimentally accessible. For that purpose, the method approaches, as has be seen, the correction by spectral deconvolution, without having neither the drawbacks nor the limitations thereof. In particular, it will be seen in what follows that the incident particle fluence is not attempted to be assessed at all.

According to the invention, the energy Ed[i] is recorded (expressed in arbitrary units AU) deposited by each interaction of an incident particle (X photon or gamma photon) in the detector 2 (FIG. 1) and this deposited energy is corrected, via a transfer function F, or weighted function, which is established by calibration, in the same unit as the incident energy measurement. The quantity F(Ed[i]) then corresponds to the dose increment that was produced by the incident radiation in the theoretical situation (FIG. 2) where the initial quantity H has to be measured.

To establish the weighting function, the detector is subjected to a set of incident radiations, covering the contemplated entire range of energies. It is set forth that this range is to be representative of the contemplated use for the dosimeter and that the desired quantity H is able to be measured or calculated, under the reference conditions and for this range of energies.

For each incident spectrum S, corresponding to one of the radiations of the set, there is therefore the knowledge of the result of the desired quantity $H_S$ (expressed in grays or sieverts for example) and the spectrum $(dn/dE)_s$ which has been recorded by means of the detector. The notation $(dn/dE)_s$ more precisely represents the count number, recorded at the energy E (or any other equivalent quantity, expressed in arbitrary units), this number being divided by the measurement pitch (energy or equivalent quantity, expressed in arbitrary units) for the incident spectrum S.

Then, the function F(E) is searched for such that:

$$\sum_E F(E) \cdot \left(\frac{dn}{dE}\right)_S \cdot \Delta E = H_S$$

for any spectrum S, where $\Delta E$ represents the energy measurement pitch, simply mentioned herein for reasons of homogeneity of the measurement units.

The following points will be noted:

1/ the response is linear with respect to the count number, which guarantees the linearity of the equation system, corresponding to the equality above, for any other dose delivered.

2/ The function F(E) does not necessarily exist. The system in question is very largely over-determined and does not have generally a solution. By way of example, if there are 10 reference spectra, recorded on 1,024 channels, the system in question includes 1,024 unknowns for 10 equations. Consequently, the function can be either decomposed into bits, or this function can be defined on a polynomial base, etc. ..., provided that the number of unknowns to be determined is lower than or equal to the number of reference spectra, the resolution being made for example by a least square method.

3/ The function F(E) aims at correcting non-linearities appearing on the energy deposited by the incident ionizing radiations. These non-linearities can have:

a) a physical origin, for example related to the non-equivalence of the detection method as regard the tissues, the rigorous absence of phantom at the back of the detector or the fact that the detector medium is not at the suitable depth and/or does not have the suitable dimensions, b) or an experimental origin, related to the detector itself or to the reading electronics associated therewith.

4/ The function F(E) is homogenous to the unit of the desired quantity H, divided by a count number. Thereby, it is expressed for example in sieverts per count or grays per count.

5/ The base of the initial spectra is any base. It is preferable that it covers the entire contemplated field of energies and that it is as rich as possible. It would be better, to that end, to have a great number of radiation sources, different from each other, and their respective spectra, measured in the detector, rather than a single result relative to the combination of radiations concerned.

In any case, if there is not always a function fulfilling the equality above, it is possible to approach it at a desired accuracy, for example by changing the nature of the detector medium.

Finally, it is to be noted that the weighting function, or correction function, is established once and for all, for a range of detectors and for a given desired quantity H. It must be transferable to all the dosimeters having the same geometry and the same detector medium, and measuring this quantity H.

The detector calibration can be very brief. It is sufficient to expose it for a given duration to a given radioactive source the activity of which is stable. Thereby, it is necessary and sufficient to ascertain the stability of the energy measurement the detector performs. Indeed, this detector operates in pulse regime such that the stability of the count number measured is guaranteed by the non-saturation of the counting rate. It is sufficient to suitably dimension the source such that the detector is not saturated.

Once the correction function is established, the dosimeter is operated in pulse regime; and, for each interaction i, the deposited energy Ed[i] is recorded. Consequently, according to the calculating means associated with the detector, it is possible to:

(a) accumulate the counts in a spectrum on a duration $\Delta T$ and, at the end of the period, calculate the desired quantity:

$$\sum_E F(E) \cdot \left(\frac{dn}{dE}\right)_S \cdot \Delta E = H_S$$

(b) or calculate, for each interaction, the dose increment:

$$H_i = H_{i-1} + F(Ed[i]).$$

In all the cases, the mean dose rate corresponds to the difference between the final and initial doses, divided by the duration of the integration period. Even so, it is noted that if the accumulation period is long, the second solution (b) enables a prompt alarm to be generated in case of excursion on high and deleterious rates.

Another example of the invention is described hereinafter.

In order to measure absorbed doses, a range of energies $[E_{min}; E_{max}]$ is chosen, where $E_{min}$ is lower than 50 keV with, by way of purely indicating and in no way limiting purposes, $E_{min}=10$ keV and $E_{max}=1$ MeV; a type of dose rate H is chosen, for example Hp (0.07); a X-radiation and gamma-radiation detector is used, which can be a multi-pixel photon counter or MPPC®, or a silicon detector or a scintillator-photomultiplier assembly; spectra S measured by the detector for various X and gamma incident radiations are established, the respective energies of which are within the chosen range and the respective doses of which are known and, from the spectra S, the weighting function F(E) is established, which is a correspondence between a mean dose increment and a mean energy E, deposited into the detector.

Figure 3:
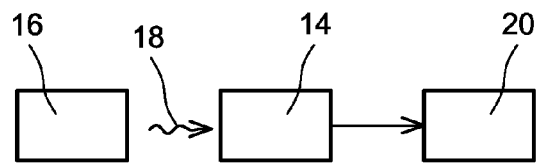
FIG. 3 is a schematic view of a facility enabling the weighting function to be determined.

A facility enabling F(E) to be determined is schematically illustrated in FIG. 3. The detector 14, for example a MPPC® equipped with a plastic scintillator, can be seen.

It operates in pulsed regimen thanks to appropriate not shown means. The detector 14 is successively exposed to various radiations S. For this, the corresponding sources are successively placed facing the detector 14. In FIG. 3, there can be seen one 16 of these sources which emits a radiation 18. The detector 14 is provided with electronic processing means 20, provided to process the signals provided by the detector when exposed to the various radiations 5, establish the various corresponding spectra $(dn/dE)_s$ and determine the function F(E).

Figure 4:
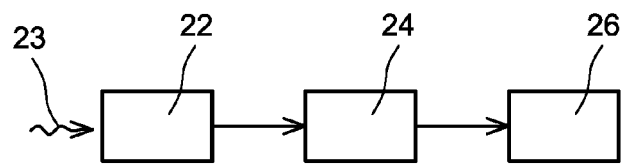
FIG. 4 is a schematic view of a particular embodiment of a system for measuring a dose, object of the invention.

FIG. 4 is a schematic view of an exemplary system for measuring a dose, object of the invention. It comprises a dosimeter 22 identical to the detector 14 of FIG. 3. Thus, this is an MPPC® equipped with its scintillator. This dosimeter 22 is able to provide signals representative of the radiations 23 it receives. The person which is provided with the dosimeter is not represented. The system of FIG. 3 also comprises an electronic processing device 24, wherein the weighting function F(E) is stored and which is provided to process the signals provided by the dosimeter 22 and determine, at any time, the mean absorbed dose, received by the person. The device 24 is provided with means 26 for displaying the results of the calculations performed by this device 24.

Figure 5:
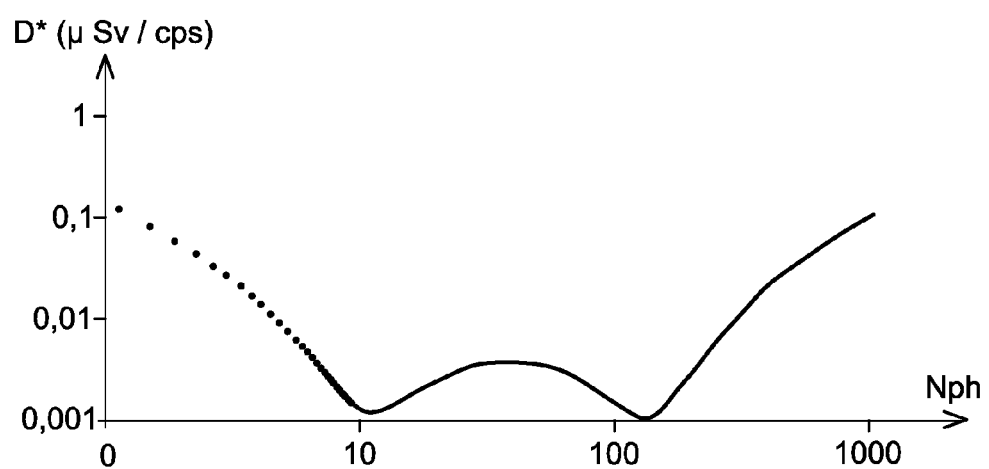
FIG. 5 shows the graph of an exemplary weighting function.

An exemplary weighting function is schematically illustrated in FIG. 5. In abscissa, there is the number of photo-electrons Nph produced by the scintillator during an interaction and measured by the MPPC®, and in ordinate, the amount D*, that is the dose divided by a count number, amount which is expressed in microsieverts per counts (µSv/cps).

To determine this function, five sources the characteristics of which are given in the table herein below are used:

| Source | $^{60}$Co | $^{22}$Na | $^{137}$Cs | $^{133}$Ba | $^{241}$Am |
|---|---|---|---|---|---|
| Activity (Bq) | $2.89 \times 10^4$ | $2.2 \times 10^5$ | $2.96 \times 10^5$ | $1.7 \times 10^4$ | $3.85 \times 10^5$ |
| Calculated dose in depth (µSv · h$^{-1}$ · Bq$^{-1}$) | $4.26 \times 10^{-3}$ | $3.87 \times 10^{-3}$ | $1.06 \times 10^{-3}$ | $8.78 \times 10^{-4}$ | $3.00 \times 10^{-4}$ |

In this example, the weighting function in the following form is searched for:

$$F(Cp) = \sum_{(i=1)}^{6} a_k \log(Cp - C_0)^k$$

where Cp represents a channel number of the processing device 24 and $C_0$ corresponds to the channel representing a null energy on this device.

The sources used enable the following coefficients to be obtained:

$a_0$=0.001173049
$a_1$=0.000641594
$a_2$=0.041835963
$a_3$=0.080156831
$a_4$=0.042976988
$a_5$=0.003726018
$a_6$=0.000000002
$C_0$=4.965286421.

The function F the graph of which is represented in FIG. 5 is deduced therefrom.

Then, laboratory tests can be made to adjust the calibration function F thus obtained for the response of the detector associated with the function F to be as close as possible to the response of a passive dosimeter expressing the deposited dose equivalent Hp (0.07). This calibration thus integrates the calibration performed in laboratory and the response in energy of the passive dosimeter.

In the examples of the invention, that have been given, Hp (0.07) has essentially been considered. But the invention is not restricted to the use of Hp (0.07). It can be implemented with any other type of dose equivalent H.

Moreover, in the examples of the invention given above, only the measurement of the X- and gamma-radiations have been considered. But the invention can be implemented with other radiations, in particular electron radiations and proton radiations.

Those skilled in the art can adapt the examples given to any other radiation measurement concept, whether this concept is different in quality (neutron, proton, . . . ) or in quantity (dosimetry or flow rate measurement).

The invention claimed is:

1. A method for measuring an absorbed dose comprising:
choosing a range of energies,
choosing a dose type H,
irradiating a detector for detecting radiations of a given type, said irradiating being controlled such that radiation of the chosen range of energies and dose type are provided to the detector,
measuring, by means of the detector for detecting radiations of a given type,
spectra $(dn/dE)_s$ for various incident radiations S of the given type, the respective energies of which are within the chosen range and the respective doses of which are known,
establishing, from the spectra $(dn/dE)_s$, a weighting function F(E) that is a correspondence between a mean dose increment and a mean energy E, the mean energy E being the average of energies Ed[i] deposited by each interaction of an incident particle of the incident radiation S in the detector for detecting radiations of a given type and the mean dose increment being the average of dose increments produced by the incident radiations S in a person, and
measuring a mean rate of a dose absorbed by the person, expressed in the dose type H, by means of a dosimeter identical to the detector for detecting radiations of the given type that was used to establish the weighting function F(E).

2. The method according to claim 1, wherein the lowest energy of the range of energies is lower than 50 keV.

3. The method according to claim 1, wherein the chosen dose type H is Hp (0.07).

4. The method according to claim 1, wherein the detector is a X and gamma radiation detector.

5. The method according to claim 4, wherein the detector is chosen from multi-pixel photon counters, silicon detectors, and scintillator-photomultiplier assemblies.

6. The method according to claim 4, wherein the weighting function is established by solving the equation:

$$\sum_E F(E) \cdot \left(\frac{dn}{dE}\right)_S \cdot \Delta E = H_S$$

for each radiation S, where $H_S$ represents the dose associated with the spectrum, $(dn/dE)_S$ represents the count number, recorded at the energy E for the radiation S, and $\Delta E$ represents the energy measurement pitch for the spectrum.

7. A system for measuring an absorbed dose using a detector for detecting radiations of a given type, wherein, in operation a chosen range of energies and a dose type H are chosen; wherein spectra $(dn/dE)_s$ are measured by the detector for various incident radiations S of the given type, the respective energies of which are within the chosen range and the respective doses of which are known; wherein, from the spectra $(dn/dE)_s$, a weighting function F(E) is established, that is a correspondence between a mean dose increment and a mean energy E, the mean energy E being the average of energies Ed[i] deposited by each interaction of an incident particle of the incident radiations S in the detector for detecting radiations of a given type and the mean dose increment being the average of dose increments produced by the incident radiations S in a person; and wherein a mean rate of a dose absorbed by the person is measured, expressed in the dose type H, by means of a dosimeter identical to the detector for detecting radiations of the given type that was used to establish the weighting function F(E), the system comprising:
the dosimeter which is able to provide signals representative of the radiations it receives, and
an electronic processing device specifically configured to process signals provided by the dosimeter in accordance with the weighting function F(E) and determine, at any time, the mean absorbed dose.

* * * * *

UNITED STATES PATENT AND TRADEMARK OFFICE
CERTIFICATE OF CORRECTION

PATENT NO. : 10,031,239 B2
APPLICATION NO. : 14/767882
DATED : July 24, 2018
INVENTOR(S) : Jean-Marc Fontbonne et al.

Page 1 of 1

It is certified that error appears in the above-identified patent and that said Letters Patent is hereby corrected as shown below:

In the Specification

Column 6, Line 22, "radiations 5" should be -- radiations S --.

Signed and Sealed this
Fourth Day of June, 2019

Andrei Iancu
*Director of the United States Patent and Trademark Office*